April 20, 1965 R. K. HATCH 3,179,268
ARTICLE HANDLING
Filed Sept. 14, 1961 2 Sheets-Sheet 1
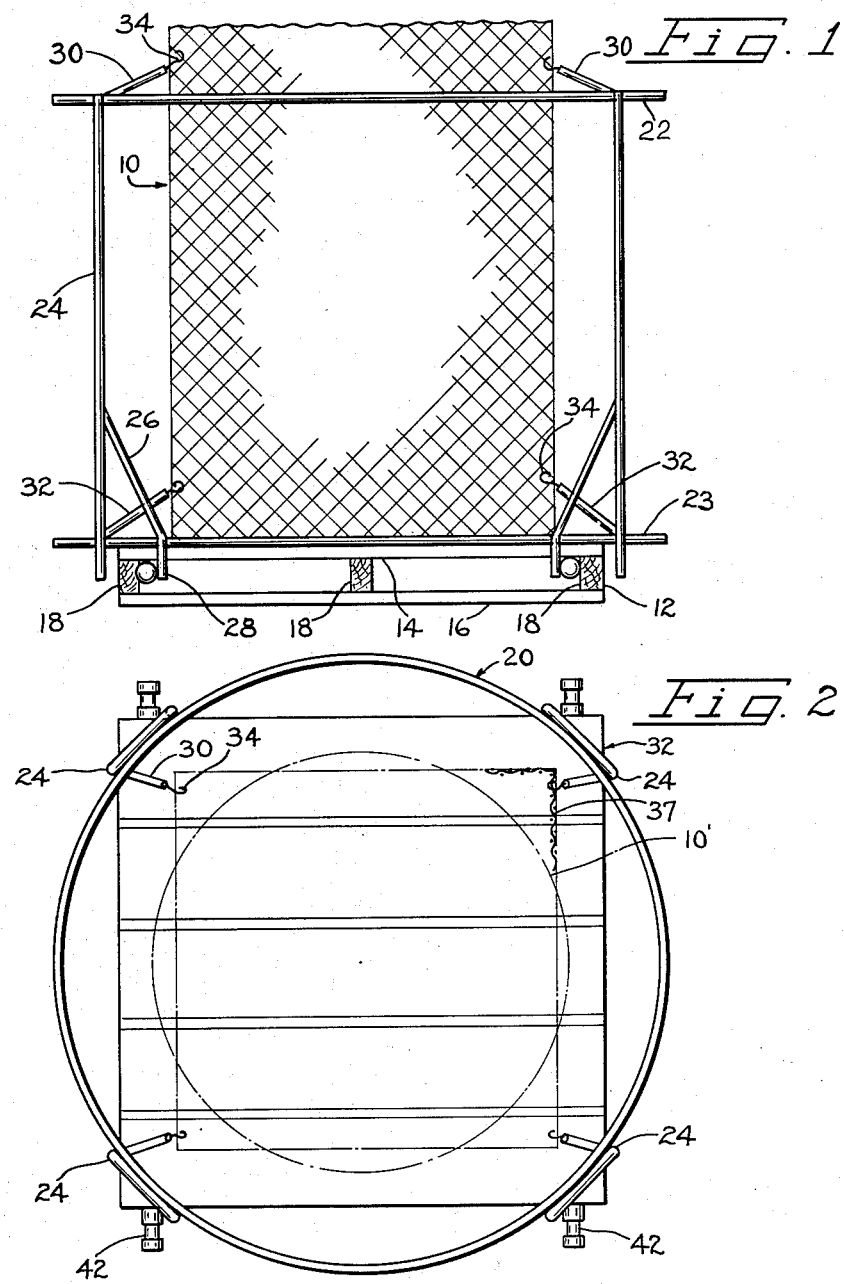
INVENTOR.
RICHARD K. HATCH
BY
Christie, Parker & Hale
ATTORNEYS April 20, 1965   R. K. HATCH   3,179,268
ARTICLE HANDLING
Filed Sept. 14, 1961   2 Sheets-Sheet 2
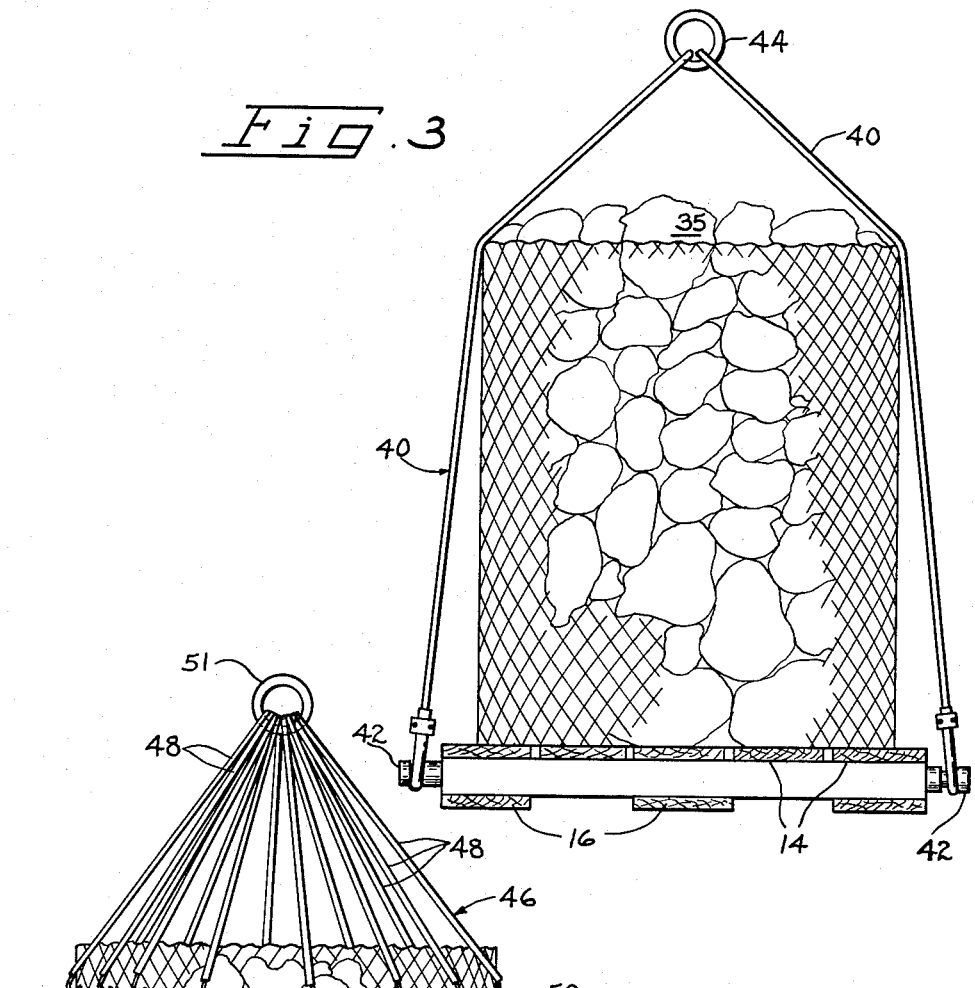
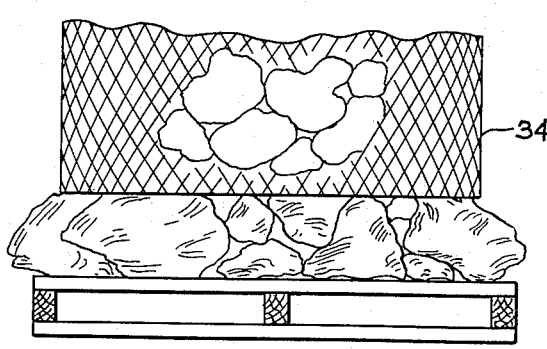
INVENTOR.
RICHARD K. HATCH
BY
Christie, Parker & Hale
ATTORNEYS

3,179,268
ARTICLE HANDLING
Richard K. Hatch, 824 Blair Ave., Sunnyvale, Calif.
Filed Sept. 14, 1961, Ser. No. 138,188
6 Claims. (Cl. 214—300)

This invention relates to method and apparatus for moving a batch of articles from one location to another.

Although the invention may be used to handle all types of articles, it is ideally suited for loading, moving, and dumping relatively large rocks, and is described with specific reference to that application.

There is a present trend to erect buildings in which relatively large rocks are imbedded in the exterior surfaces of precast concrete walls. An important factor in the wide acceptance of such construction is the provision of rock aggregate at a reasonable price. A large part of the cost of such aggregate is in the labor required for moving it from a quarry to the construction site.

This invention provides a simple and reliable system for loading and moving a batch of rock aggregate or similar articles at a minimum cost.

In terms of method, the invention includes disposing an upright sleeve on a pallet, and loading a batch of rocks or articles in the sleeve to rest on the pallet. Thereafter, the pallet is lifted to raise the sleeve and rocks. The pallet is moved from the first or loading location to a second or unloading location, and the sleeve is lifted from the pallet to leave the articles free to roll or slide off of it. The relatively few articles remaining on the pallet are removed, say by hand, so the pallet can be reused.

In terms of apparatus, the invention includes a pallet and an upright sleeve releasably disposed on the pallet to form a container space over the pallet for a batch of articles, such as rocks. Means are provided for lifting the pallet to move the sleeve and batch of articles from a first location to a second location. Means are also provided for lifting the sleeve from the pallet at the second location to leave the articles free to slide off of the pallet.

In the preferred embodiment, the sleeve is made of a flexible screen, and sometimes includes a relatively fine mesh liner to prevent the loss of smaller articles in the batch.

The preferred form of the invention also includes a frame constructed to be releasably attached to the pallet and hold the empty screen in an open or loading position. After the screen is loaded and packed fairly solidly with the articles, the frame is disconnected from the screen and removed from the pallet.

These and other aspects of the invention will be more fully understood from the following detailed description and the accompanying drawings, in which:

FIG. 1 is an elevation showing the sleeve supported by the frame on the pallet;

FIG. 2 is a plan view of the apparatus shown in FIG. 1;

FIG. 3 is an elevation of a batch of rocks being lifted by a sling attached to the pallet; and FIG. 4 is an elevational view of the batch of rocks being dumped from the sleeve.

Referring to FIGS. 1 and 2, a sleeve 10 is mounted in an upright position on the top of a conventional pallet 12, which includes top and bottom boards 14 and 16, respectively, secured to transverse stringers 18. The sleeve has an unobstructed open top, and may be made of any suitable material, but preferably it is made of a length of open mesh chain link fencing material secured together at its ends. Such a sleeve is flexible, which facilitates loading and dumping large rocks. As shown best in FIG. 2, the pallet is square in plan view, and is substantially larger in area than the cross sectional area of the sleeve.

A loading frame 20 is mounted on the top of the pallet, and includes a pair of vertically spaced top and bottom rigid rings 22, 23 secured together by four vertical posts 24. Each post extends down below the bottom ring, which rests on top of the pallet, and engages a respective side of the pallet adjacent each corner. A separate diagonal brace 26 is secured at its upper end to an intermediate part of each post, and at its lower end to the bottom ring. A separate downwardly extending foot 28 is secured to the bottom ring at the lower end of each diagonal brace so that each foot and the lower end of the adjacent post straddle a respective corner of the platform. Thus, the frame is releasably secured to the pallet, but prevented from shifting laterally with respect to it.

The outer ends of a first set of four elastic straps 30 are secured at equally spaced intervals to the top ring 22. A second set of four elastic straps 32 are secured at their outer ends to the bottom ring 23 at equally spaced intervals. A separate hook 34 is secured to the inner end of each strap and hooked into the screen sleeve to hold it in a generally square cross section (FIG. 2) and urge it downwardly (FIG. 1) against the pallet.

A batch of articles, say large rock aggregate 35 (FIG. 3), is dumped into the top of the sleeve until it is substantially full. The sleeve is expanded by the load of rocks to the circular shape indicated by the dotted line 10' shown in FIG. 2. The rocks are irregular in shape so they interlock with each other and the open mesh of the sleeve to form an integral mass which rests firmly on the pallet. In a typical system, the pallet was 42" x 42", the sleeve was 42" high and 40" in diameter when filled, and the load of rock weighed about 2 tons.

When the rocks tend to crumble, and it is desired to retain the smaller pieces in the load, a removable liner 37 (FIG. 2) is placed in the sleeve to prevent loss of the fines. The liner may be of any suitable material, such as burlap.

After the sleeve is loaded to the desired level, the hooks 34 are disconnected from the sleeve, and the loading frame is removed by lifting it from the pallet. Preferably, the frame is then set over the following pallet (not shown) to be filled.

The pallet and loaded sleeve are lifted, say onto a truck (not shown), by securing a wire sling 40 to opposite ends of a pair of loading bars 42 inserted through the pallet near opposite edges. The upper end of the sling is secured in a hook ring 44, which can be attached to a crane or boom (not shown) so the pallet can be moved from one location to another. Usually a plurality of loaded pallets are hoisted on a truck at a quarry, and then transported to a job site where forms (not shown) are set on the ground for casting concrete walls with the rocks imbedded in the walls.

The pallet is set down in an unloading location, say in a form (not shown) at the job site, by a crane or boom (not shown). The screen sleeve is lifted from the pallet by an unloading sling 46 (FIG. 4) attached to the upper edge of the sleeve. The unloading sling 46 includes a plurality of individual straps 48 secured at their lower ends by hooks 50 to the upper end of the sleeve. The upper ends of the straps 48 are secured to a lifting ring 51, which is lifted by a crane or boom. As the sleeve is pulled up, the rocks tumble out of the bottom of the sleeve and slide off of the pallet. The relatively few rocks remaining on the pallet are removed by hand so the pallet can be re-used.

Occasionally the rocks tend to jam in the sleeve as it is lifted. The rocks are jarred loose by gently bumping the bottom of the load on the pallet. The flexible screen is easily deformed slightly by such bumping and permits the rocks to tumble out.

In using the invention to move rocks from a quarry to a job site where they are molded in a concrete wall cast in forms, a boom or crane is preferred to lift and move the loaded pallet, because a conventional fork lift usually cannot operate under quarry conditions, nor can it place the loaded pallets in the forms at the job site. However, for those applications where a fork lift can be used to move the pallet from one location to another, the loading bars may be replaced by a fork lift.

I claim:

1. Apparatus for handling a batch of articles, the apparatus comprising a pallet, an upright flexible and deformable sleeve releasably disposed on the pallet to form a container space over the pallet for a batch of the articles, the sleeve having an unobstructed open top which is substantially smaller than the pallet, means for lifting the pallet to move the sleeve and batch of articles from a first location to a second location, and means for lifting the sleeve from the pallet at the second location to leave the articles free to slide off of the pallet.

2. Apparatus according to claim 1 in which the sleeve is open mesh.

3. Apparatus according to claim 2 which includes a removable liner disposed in the sleeve.

4. Apparatus for handling a batch of articles, the apparatus comprising a pallet, an upright sleeve releasably disposed on the pallet to form a container space over the pallet for a batch of the articles, a frame releasably mounted on the pallet around the sleeve, releasable means securing the sleeve to the frame, means for lifting the pallet to move the sleeve and batch of articles from a first location to a second loaction, and means for lifting the sleeve from the pallet at the second location to leave the articles free to slide off of the pallet.

5. Apparatus for handling a batch of articles, the apparatus comprising a pallet, an upright flexible and deformable sleeve releasably disposed on the pallet to form a container space over the pallet for a batch of the articles, the sleeve having an unobstructed open top which is substantially smaller than the pallet, a lifting sling attached to the pallet independent of the sleeve for lifting the pallet to move the sleeve and batch of articles from a first location to a second location, and means for lifting the sleeve from the pallet at the second location to leave the articles free to slide off of the pallet.

6. Apparatus for handling a batch of articles, the apparatus comprising a pallet, an upright flexible and deformable sleeve releasably disposed on the pallet to form a container space over the pallet for a batch of the articles, the sleeve having an unobstructed open top which is substantially smaller than the pallet means for lifting the pallet to move the sleeve and batch of articles from a first location to a second location, a sleeve sling, and means for releasably attaching the sleeve sling to the upper portion of the sleeve at a plurality of points for lifting the sleeve from the pallet at the second location to leave the articles free to slide off of the pallet.

References Cited by the Examiner

UNITED STATES PATENTS

| 1,679,981 | 8/28 | Lawrence. | |
|---|---|---|---|
| 1,900,756 | 3/33 | Butts | 214—10.5 |
| 2,309,284 | 1/43 | Thornley | 294—72 |
| 2,837,369 | 6/58 | Stopps | 294—72 X |
| 2,901,141 | 8/59 | Dedmon. | |
| 2,975,929 | 3/61 | Sjoblom | 294—67 X |

FOREIGN PATENTS 1,214,029  4/60  France.

HUGO O. SCHULZ, *Primary Examiner.*

MORRIS TEMIN, *Examiner.*